United States Patent
Chang et al.

(10) Patent No.: US 6,769,945 B2
(45) Date of Patent: Aug. 3, 2004

(54) METHOD OF GROWING ISOMERIC CARBON EMITTERS ONTO TRIODE STRUCTURE OF FIELD EMISSION DISPLAY

(75) Inventors: Yu-Yang Chang, Tainan (TW);
Hua-Chi Cheng, Hsinchu Hsien (TW);
Jyh-Rong Sheu, Hsinchu (TW);
Ching-Hsun Chao, Kaohsiung (TW);
Kuang-Chung Chen, Hsin-Chuang (TW)

(73) Assignee: Industrial Technology Research Institute, Hsinchu (TW)

( * ) Notice: Subject to any disclaimer, the term of this patent is extended or adjusted under 35 U.S.C. 154(b) by 117 days.

(21) Appl. No.: 10/228,343

(22) Filed: Aug. 24, 2002

(65) Prior Publication Data

US 2004/0038614 A1 Feb. 26, 2004

(51) Int. Cl.[7] ................................................. H01J 9/02
(52) U.S. Cl. ........................................................ 445/24
(58) Field of Search ............................................ 445/24

(56) References Cited

U.S. PATENT DOCUMENTS

| | | | | |
|---|---|---|---|---|
| 6,062,931 | A | 5/2000 | Chuang et al. | 445/24 |
| 6,339,281 | B2 * | 1/2002 | Lee et al. | 313/309 |
| 6,504,292 | B1 * | 1/2003 | Choi et al. | 313/310 |
| 6,630,772 | B1 * | 10/2003 | Bower et al. | 313/311 |
| 6,664,727 | B2 * | 12/2003 | Nakamoto | 313/495 |
| 2003/0090190 | A1 * | 5/2003 | Takai et al. | 313/311 |
| 2003/0141798 | A1 * | 7/2003 | Jin et al. | 313/310 |

OTHER PUBLICATIONS

"Fabricated and electrical characteristics of carbon nanotube field emission microcathodes with an intergrated gate electrode", Institute of Physics Publishing, Oct. 2, 2001.

Realization of Gated Field Emitters for Electrophotonic Applications Using Carbon Nanotube Line Emitters Directly Grown into Submicrometer Holes, by Yun–Hi Lee, Yoon–Taek Jang, Dong–Ho Kim, Jin–Ho Ahn, and Byeong–Kwon Ju, Adv. Mater. 2001, 13, No. 7, Apr. 4.

"Growth and field emission of carbon nanotubes on electroplated Ni catalyst coated on galss substrates", Journal of Applied physics, vol. 90, No. 5, Sep. 1, 2001.

* cited by examiner

Primary Examiner—Kenneth J. Ramsey
(74) Attorney, Agent, or Firm—Troxell Law Office PLLC

(57) ABSTRACT

A triode structure of a field emission display is manufactured with thick-film technology. The triode structure includes a cathode electrode layer that comprises a metallic catalyst. Isomeric carbon emitters can be grown on the cathode electrode layer by CVD process at a low temperature because of the metallic catalyst. Instead of mixing the metallic catalyst in the cathode electrode layer, a metallic catalyst layer can be formed on the cathode electrode layer to facilitate the growth of the isomeric carbon emitters. The combination of thick film technology and low temperature CVD process provide a low cost method for fabricating a large area field emission display with isomeric carbon emitters.

12 Claims, 7 Drawing Sheets

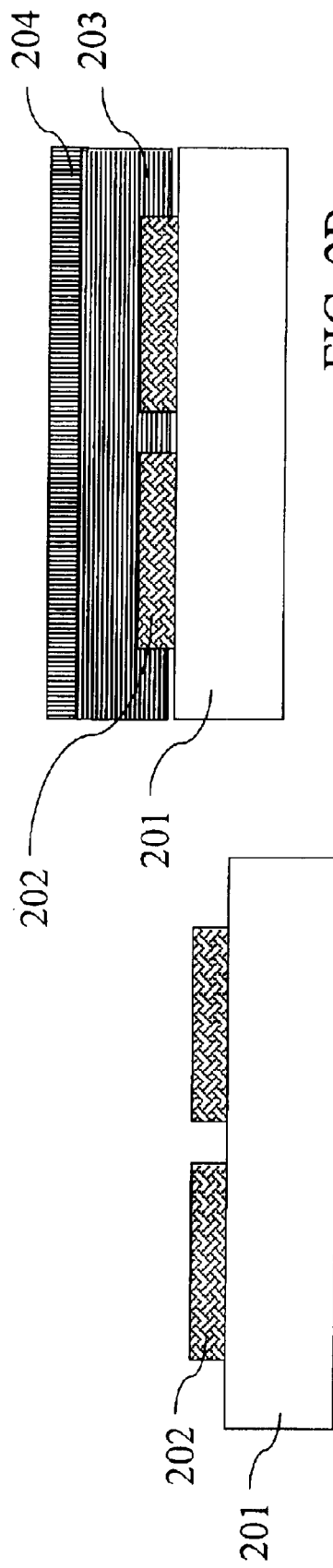
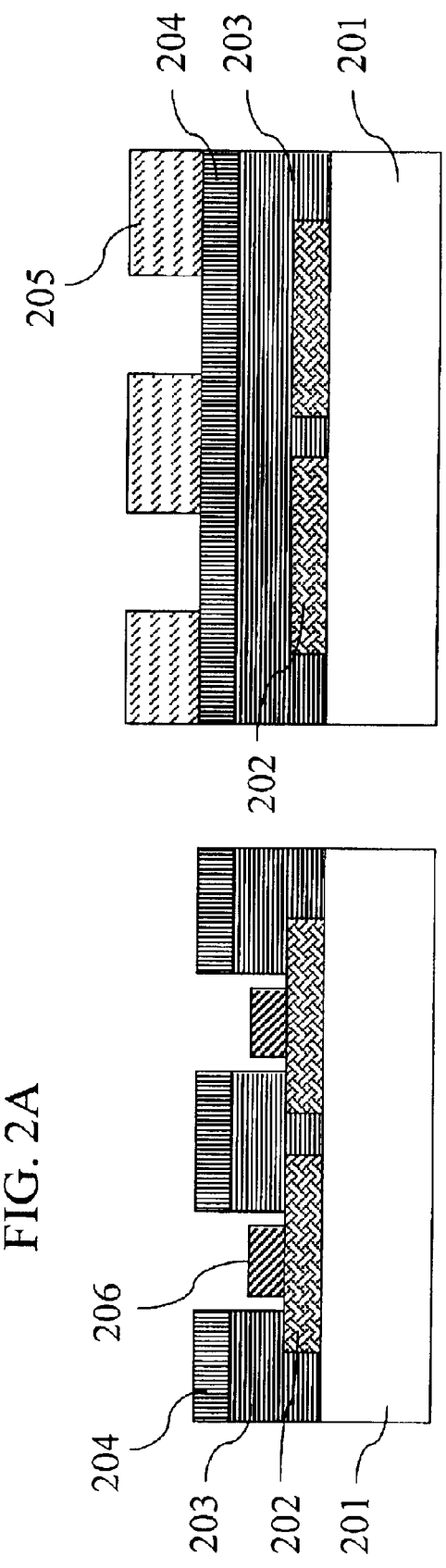
FIG. 2A
FIG. 2B
FIG. 2C
FIG. 2D

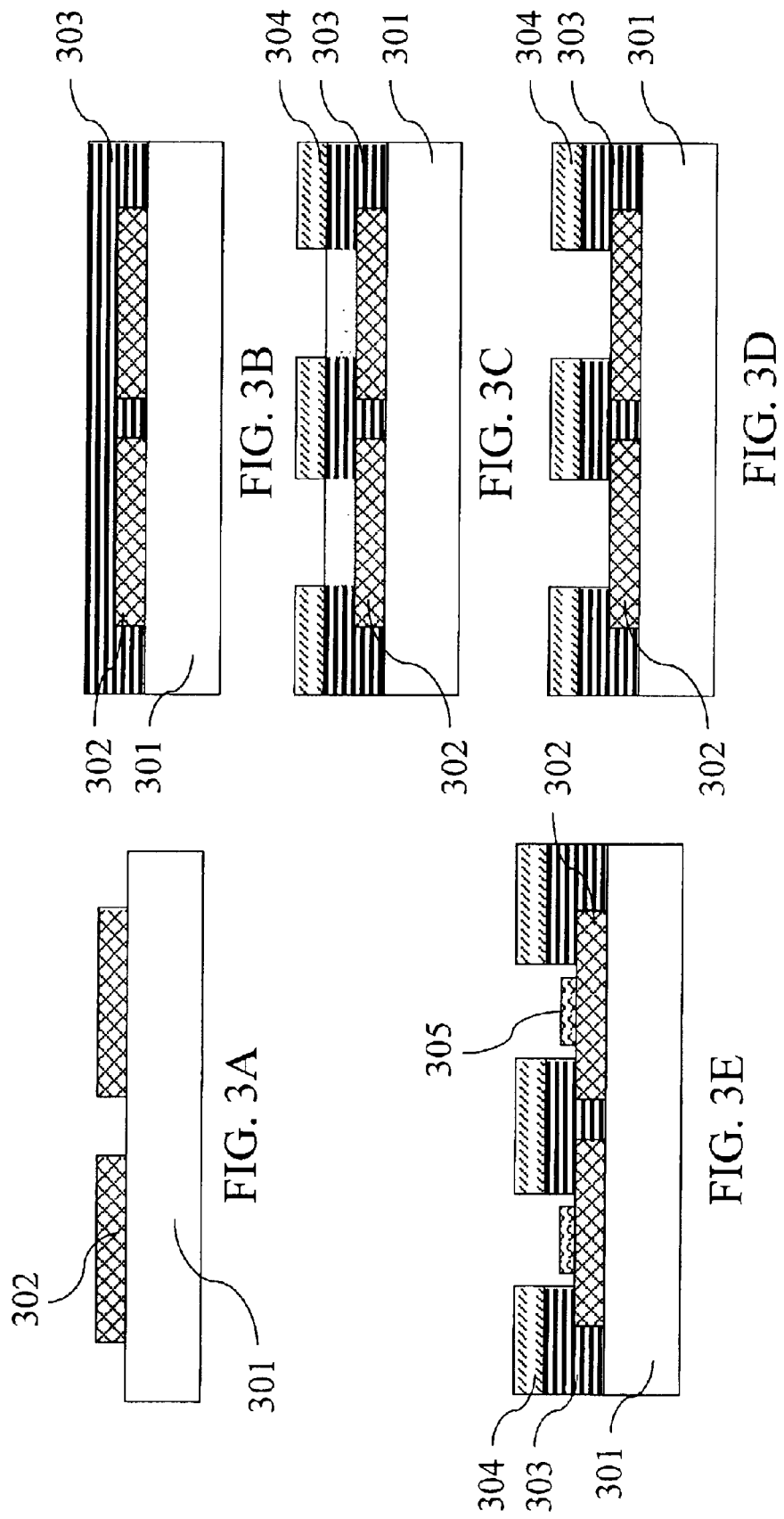

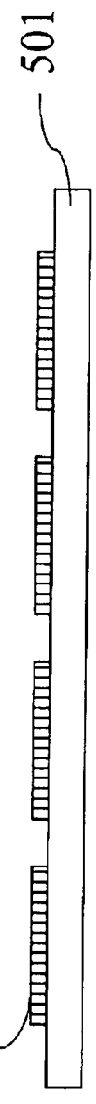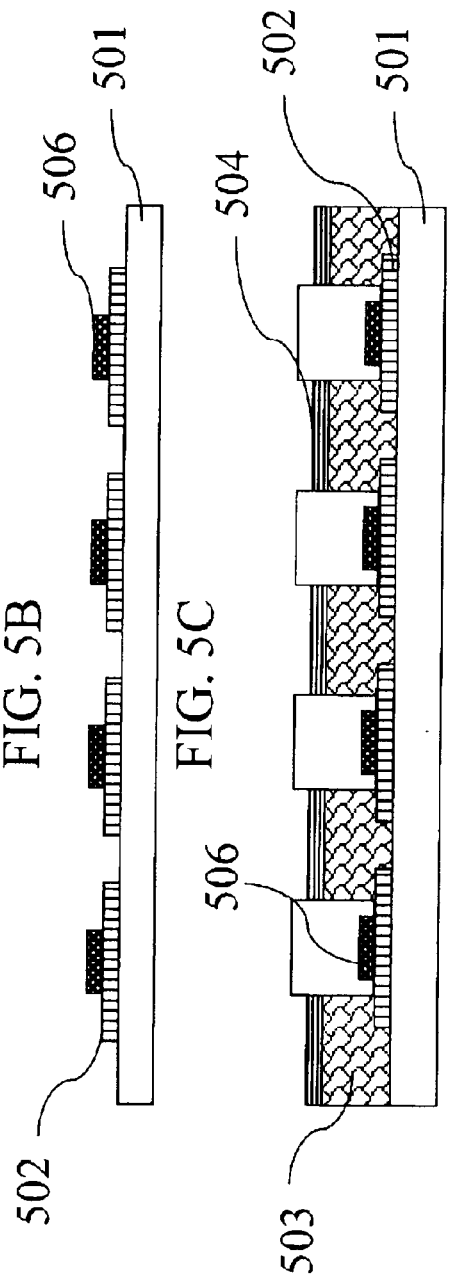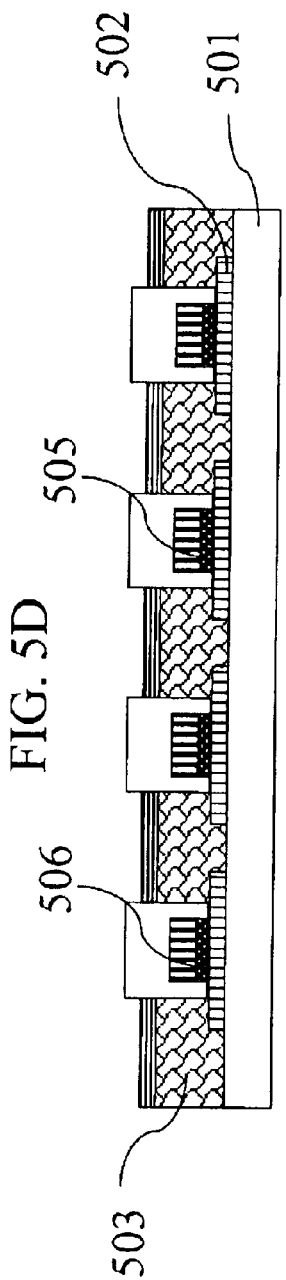
FIG. 5A
FIG. 5B
FIG. 5C
FIG. 5D
FIG. 5E

METHOD OF GROWING ISOMERIC CARBON EMITTERS ONTO TRIODE STRUCTURE OF FIELD EMISSION DISPLAY

FIELD OF THE INVENTION

The present invention generally relates to a field emission display (FED), and more specifically to the growth of isomeric carbon emitters onto a triode structure of a field emission display.

BACKGROUND OF THE INVENTION

Field emission displays have been researched extensively in recent years for manufacturing large-size flat panel displays. A field emission display uses cold cathode emitter tips as electron sources instead of a hot cathode electron gun used in a conventional cathode ray tube (CRT). When a field emission display is placed in an electric field, cold cathode emitter tips aim at a phosphor-coated anode substrate fabricated in the field emission display and emit a bundle of electrons to hit the phosphor.

FIG. 1 shows a schematic diagram of a carbon nanotube field emission display with a triode structure. Electrons, being attracted by an electric field and emitted out of emitter tips 103 formed above a cathode glass substrate 101, are accelerated by the positive voltage applied to an anode substrate 104 to hit coated phosphor 106 on the anode 105 and then produce luminescence. Carbon nanotube emitters 103 are formed within cavities of a dielectric layer 107 on a cold cathode layer 102 that is formed on the glass substrate 101. Openings are formed at the intersections of the cathode layer 102 and a gate layer 108 for the electrons to emerge through.

FIGS. 2A–2D illustrate a method of manufacturing the cathode plate of a carbon nanotube field emission display. A conductive paste is deposited and patterned on the surface of a transparent substrate 201 to form a cathode electrode layer 202 as shown in FIG. 2A. The whole surface of the cathode electrode layer 202 is deposited with a layer of etchable dielectric material 203 as shown in FIG. 2B. A layer of conductive gate material 204 is further deposited on the dielectric layer 203. The gate pattern is defined by a patterned photo-resist layer 205 as shown in FIG. 2C. The gate electrode and dielectric materials are removed by sandblasting and fired in air. Finally, carbon nanotube emitter layer 206 are coated on the cathode electrode layer 202 shown in FIG. 2D by a screen printing process.

The carbon nanotube emitter layer 206 of the field emission displays shown in FIG. 2 is fabricated by a screen printing method. A pre-mixed paste is applied to the surface of a pre-patterned screen and scraped using a scraper to print the pattern onto a glass substrate. Such process is repeatedly used to stack layers of patterns. The method has some drawbacks. It is difficult to increase the resolution of the printed pattern because of the limitation in the size of the screen mesh. The initial field emission voltage must be high enough to get sufficient brightness for the display. Also, the thickness of the printing film may not be uniform enough and the printed pattern may be inaccurate due to the non-uniform tension of the screen. Therefore, the distribution of the electric field is non-uniform and the alignment at post-process is difficult.

In order to overcome the drawbacks of the conventional methods and improve the quality of carbon nanotube filed emission displays, fabrication of the cathode plate using other thick-film technology has been proposed. By combining photolithography process and etching process, one method uses a photoconductive paste and an etchable dielectric material to fabricate the cathode plate of a carbon nanotube field emission display.

FIGS. 3A–3E illustrate a method of manufacturing the cathode plate of a carbon nanotube field emission display using a thick-film technology. A conductive paste is deposited and patterned on the surface of a transparent substrate 301 to form a cathode electrode layer 302 as shown in FIG. 3A. The whole surface of the cathode electrode layer 302 is deposited with a layer of etchable dielectric material 303 as shown in FIG. 3B. A layer of conductive gate material 304 is further deposited on the dielectric layer 303. Gate patterns are then printed by a photolithography process and sintered to finish a gate electrode layer 304 as illustrated in FIG. 3C. The gate pattern is used as a protecting film to etch a portion of the dielectric layer not covered by the protecting film in a photolithography process as shown in FIG. 3D. Finally, a carbon nanotube emission layer 305 is filled on the cathode electrode layer to form a cathode plate structure shown in FIG. 3E.

The fabrication of the carbon nanotube emission layer 305 can be accomplished with a photolithography method by depositing a layer of photosensitive carbon nanotube paste on the surface of the cathode plate shown in FIG. 3D and define a pattern for the carbon nanotube emission layer 305 by alignment and exposure. It is then sintered in an nitrogen atmosphere. The carbon nanotube emission layer 305 can also be fabricated by an electrical deposition method comprising the steps of depositing a layer of positive or negative photoresist on the surface of the cathode electrode layer 302 and the gate electrode layer 304 shown in FIG. 3D, and using a mask to define a photoresist pattern by alignment and exposure. After the photoresist pattern is formed above the gate pattern 304, the carbon nanotube emission layer 305 is then formed by electrically depositing a carbon nanotube paste on the cathode electrode 302 and sintering in an oven at a nitrogen atmosphere.

As described above, the fabrication process of the carbon nanotube emitter layer in the triode structure of a carbon nanotube field emission display requires rigorous alignment between the gate aperture and the pattern of the carbon nanotubes. The process is difficult and expensive. Many technical obstacles remain to be overcome for the mass production of carbon nanotube field emission displays.

Chemical vapor deposition (CVD) using catalytic metals has many advantages over other techniques and has proved to be a cheap process for large-area deposition of carbon nanotubes. However, the reaction temperature of thermal CVD is generally as high as 700–1000° C. which is well above the softening temperature 600° C. of a commonly used glass substrate of a flat panel display. Recently, the growth of carbon nanotubes on Ni catalyst coated on soda-lime glass substrate using CVD of $C_2H_2$ gas at 550° C. has been reported. There is a strong need in developing an integrated thick-film process for fabricating the triode structure in combination with a low temperature CVD process for the mass production of carbon nanotube field emission displays.

SUMMARY OF THE INVENTION

This invention has been made to overcome the above-mentioned drawbacks in manufacturing conventional field emission displays. The primary object is to provide a low cost method for fabricating isomeric carbon emitters onto a triode structure of a field emission display. Accordingly, the triode structure is manufactured using a thick-film technology and then the isomeric carbon emitters are grown onto the triode structure by using CVD process.

Another object of the invention is to provide a cathode electrode layer of the triode structure on which the isomeric carbon emitters can be readily grown by using CVD process. According to the invention, a metallic catalyst is first mixed with the conductive metal powder that is used to form the cathode electrode layer. A conductive metal paste is then formed from the conductive metal powder. The cathode electrode layer is fabricated by the conductive metal paste on a transparent substrate using thick-film technology. A dielectric layer and a gate electrode layer are then deposited above the cathode electrode layer and patterned to form the triode structure. Because the cathode electrode layer comprises the metallic catalyst, the isomeric carbon emitters can be grown onto the triode structure easily.

It is also an object of the invention to provide a metallic catalyst layer in the triode structure to facilitate the growth of the isomeric carbon emitters of the field emission display. Instead of mixing the metallic catalyst with the conductive metal paste that forms the cathode electrode layer on a transparent substrate, a layer of metallic catalyst is formed on the cathode electrode layer. A dielectric layer and a gate electrode layer are then formed above the metallic catalyst layer, the cathode electrode layer and the transparent substrate. After patterning the dielectric layer and the gate electrode layer, the triode structure is formed. The isomeric carbon emitters can then be grown on the metallic catalyst layer using CVD process.

According to the present invention, the triode structure can be manufactured using screen printing, dry-etching and sandblasting, or thick-film photo process with yellow light. The patterning of the cathode electrode layer or the metallic catalyst layer can be accomplished by screen printing or thick-film photo process using yellow light. The metallic catalyst comprises iron (Fe), cobalt (Co) or nickel (Ni). The isomeric carbon emitters fabricated can be carbon nanotubes, carbon fiber or graphite nano-fiber.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIGS. 2A–2D illustrate a method of fabricating a carbon nanotube field emission display using a sandblasting process and a screen printing method.

FIGS. 3A–3E illustrate a method of fabricating a carbon nanotube field emission display using thick-film technology in corporation with a photolithographic patterning or electrical deposition method.

FIGS. 4A–4D shows a method of fabricating a carbon nanotube field emission display using thick-film technology in corporation with CVD process according to a first preferred embodiment of the present invention.

FIGS. 5A–5E shows a method of fabricating a carbon nanotube field emission display using thick-film technology in corporation with CVD according to a second preferred embodiment of the present invention.

DETAILED DESCRIPTION OF THE PREFERRED EMBODIMENTS

Figure 1:
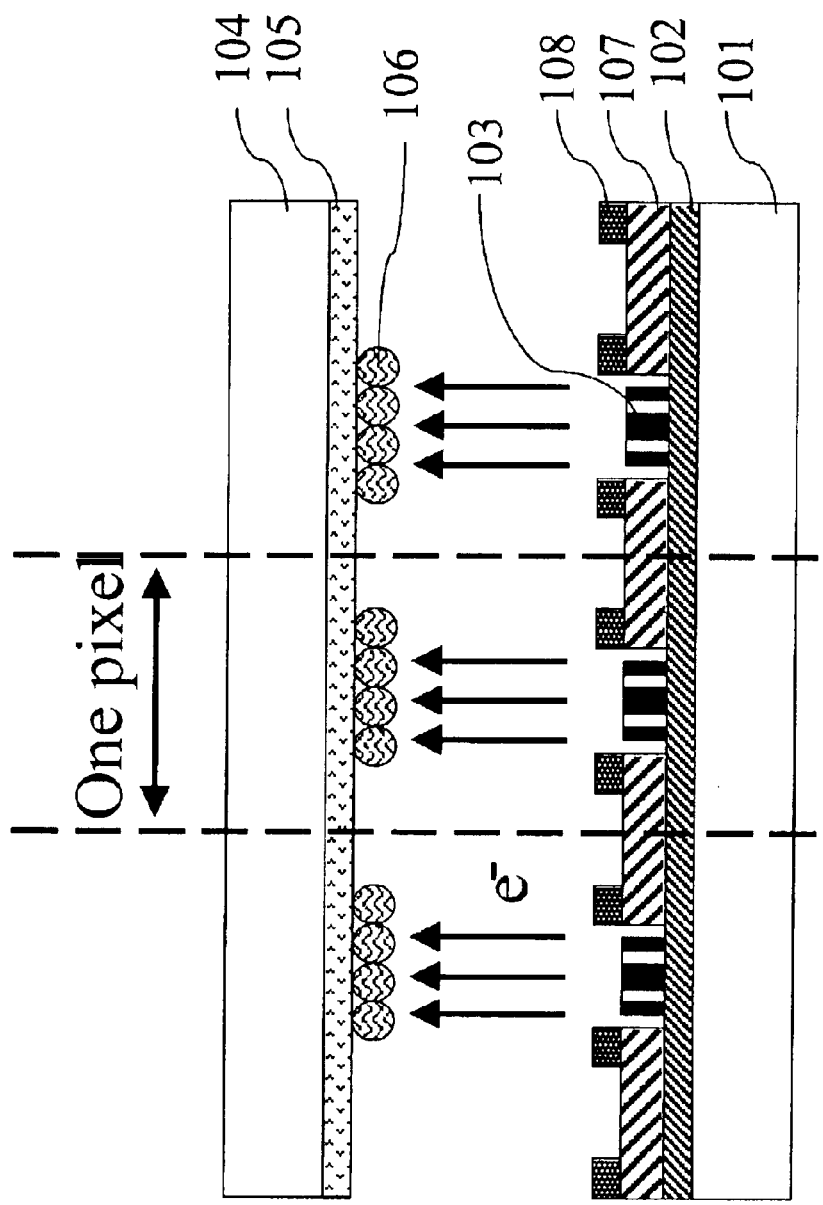
FIG. 1 shows a schematic diagram of a triode structure of a carbon nanotube field emission display.

With reference to FIG. 4, the steps in the process of fabricating the carbon nanotube field emission display according to a first preferred embodiment are shown to describe the details of the present invention. A transparent substrate 401 is first prepared as shown in FIG. 4A. A cathode electrode layer 402 shown in FIG. 4B is formed on the transparent substrate 401.

A layer of conductive paste is first deposited on the transparent substrate 401. The conductive paste is patterned by a photolithography process and undergoes sintering to form the cathode electrode layer 402. The photolithography process includes the definition of a pattern by a photo-mask after pre-bake, and the steps of photo exposure and development. FIG. 4B illustrates a cross sectional view of the pattern of the cathode electrode layer 402 after developing. The cathode electrode layer 402 can also be patterned using screen printing technique.

In the first preferred embodiment of the present invention, the cathode electrode layer 402 comprises a catalytic conductive material to facilitate the growth of carbon nanotubes in the later CVD process. A metallic catalyst is first mixed with a conductive metal powder. A conductive paste is then formed from the mixed metal powder. The metallic catalyst can be iron (Fe), nickel (Ni), or Cobalt (Co). A dielectric layer 403 is then deposited on the substrate 401 and the cathode electrode layer 402. A gate electrode layer 404 is further deposited on the dielectric layer 403. A gate structure is fabricated using either a sandblasting process or a photolithographic process. FIG. 4C shows the cross-sectional view of the gate structure.

The cathode electrode layer 402 comprises multiple parallel electrode strips. The dielectric layer 403 comprises multiple parallel strips of dielectric material. The gate electrode layer 404 comprises multiple parallel electrode strips. Each gate electrode strip is located on the top of a dielectric strip and is perpendicular to cathode electrode strips. There are circular openings on gate electrode strips and circular cavities on the dielectric strips at intersections with cathode electrode strips. Within the circular cavities, a carbon nanotube field emission layer 405 is deposited by a CVD process at a low temperature.

With reference to FIG. 5, the steps in the process of fabricating the carbon nanotube field emission display according to a second preferred embodiment are shown. Similar to the first embodiment, a transparent substrate 501 is first prepared as shown in FIG. 5A. A cathode electrode layer 502 shown in FIG. 5B is formed on the transparent substrate 501. A metallic catalyst layer 506 is then formed on the cathode electrode layer 502 to facilitate the growth of carbon nanotubes in the later CVD process.

In the second embodiment, a layer of conductive paste is first deposited on the transparent substrate 501. The conductive paste is patterned by a photolithography process and undergoes sintering to form the cathode electrode layer 502. FIG. 5B illustrates a cross sectional view of the pattern of the cathode electrode layer 502 after developing. Instead of mixing the metallic catalyst in the conductive paste, a metallic catalyst layer 506 is formed on the cathode electrode layer 502. As shown in FIG. 5C the metallic catalyst layer 506 is to facilitate the growth of carbon nanotubes in the later CVD process. The metallic catalyst can be transition metals such as iron (Fe), nickel (Ni), or Cobalt (Co).

The following process in the second embodiment is identical to the first embodiment. A dielectric layer 503 is deposited on the substrate 501, the cathode electrode layer 502 and the metallic catalyst layer 506. A gate electrode layer 504 is further deposited on the dielectric layer 503. A gate structure is then fabricated using either a sandblasting process or a photolithographic process. FIG. 5D shows the cross-sectional view of the gate structure. The dielectric material used in the first embodiment can also be used in the second embodiment. A carbon nanotube layer 505 is grown on the metallic catalyst layer 506 using CVD.

Figures 6A, 6B:
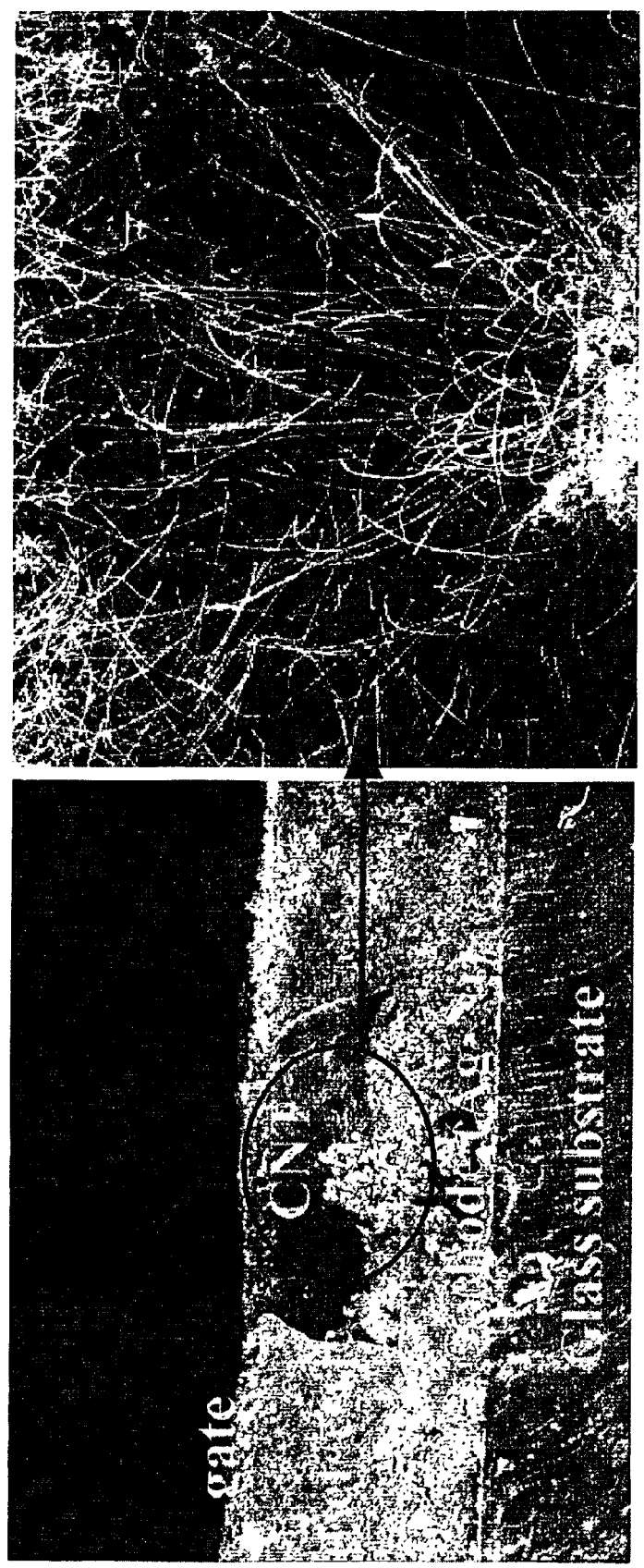
FIG. 6A shows the SEM cross-section view of one gated-electrode hole after CNT grown on cathode with 500 magnification and FIG. 6B shows a similar view with 500 magnification
Figure 7:
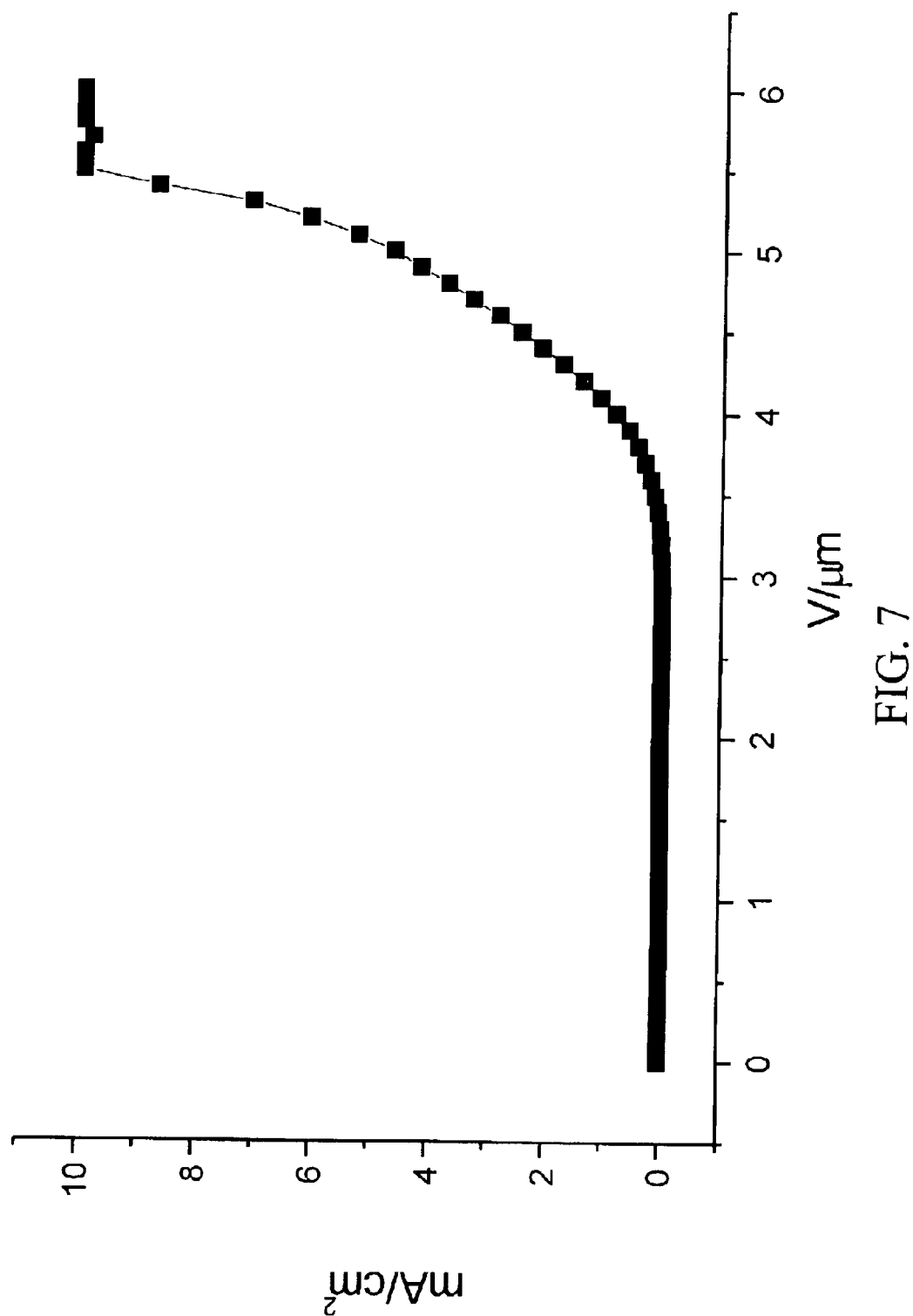
FIG. 7 shows the I–V curve of the isomeric carbon emitters using CVD growth according to the present invention.

FIG. 6 illustrates SEM images taken for the isomeric carbon emitters fabricated according to the process of the invention. The gate structure is manufactured with sandblasting process and the isomeric carbon emitter layer is deposited by CVD. FIG. 6A shows the SEM cross-section view of one gated-electrode hole after CNT grown on cathode with 500 magnification and FIG. 6B shows a similar view with 5000 magnification.

According to this invention, the carbon nanotube emission layer 405 or 505 is fabricated on the cathode electrode layer 402 or the metallic catalyst layer 506 by CVD. The cathode electrode layer 402 that comprises metallic catalyst or the metallic catalyst layer 506 is fabricated using thick film technology such as screen printing or thick-film photo process with yellow light. The formation of the triode structure may further include sandblasting. The isomeric carbon emitters fabricated by the present invention can be carbon nanotube, carbon fiber or graphite nanofiber.

In summary, this invention fabricates a triode structure with either a cathode electrode layer that comprises metallic catalyst or a metallic catalyst layer on a cathode layer using thick film technology. An isomeric carbon emitter layer is then fabricated directly on the cathode electrode layer or the metallic catalyst layer using CVD technology. The combination of the thick film and CVD technologies provide a low cost technique for manufacturing large area field emission displays.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of fabricating a triode structure for a field emission display, said method comprising the steps of:
    (a) preparing a transparent substrate;
    (b) depositing a layer of conductive paste on said transparent substrate and patterning said layer of conductive paste to form a cathode electrode layer, said conductive paste comprising metallic catalyst;
    (c) forming a gate structure above said cathode electrode layer and said transparent substrate using sandblasting or thick-film photo process with yellow light; and
    (d) fabricating an isomeric carbon emitter on said cathode electrode layer.

2. The method of fabricating a triode structure as claimed in claim 1, wherein said metallic catalyst comprised in said layer of conductive paste in step (b) is a transition metal.

3. The method of fabricating a triode structure as claimed in claim 1, wherein said metallic catalyst comprised in said layer of conductive paste in step (b) is Fe, Co or Ni.

4. The method of fabricating a triode structure as claimed in claim 1, patterning said cathode electrode layer in step (b) being accomplished by screen printing or thick-film photo process with yellow light.

5. The method of fabricating a triode structure as claimed in claim 1, said method including screen printing, sandblasting and thick-film photo process with yellow light.

6. The method of fabricating a triode structure as claimed in claim 1, wherein said isomeric carbon emitters are carbon nonotube, carbon fiber or graphic nano-fiber.

7. A method of fabricating a triode structure for a field emission display, said method comprising the steps of:
    (a) preparing a transparent substrate;
    (b) depositing a layer of conductive paste on said transparent substrate and patterning said layer of conductive paste using to form a cathode electrode layer;
    (c) forming a layer of metallic catalyst on said cathode electrode layer;
    (d) forming a gate structure above said cathode electrode layer and said transparent substrate using sandblasting or thick-film photo process with yellow light; and
    (e) fabricating an isomeric carbon emitter layer on said cathode electrode layer.

8. The method of fabricating a triode structure as claimed in claim 7, wherein said metallic catalyst layer in step (c) comprises a transition metal.

9. The method of fabricating a triode structure as claimed in claim 7, wherein said metallic catalyst layer in step (c) comprises Fe, Co or Ni.

10. The method of fabricating a triode structure as claimed in claim 7, patterning said cathode electrode layer in step (b) being accomplished by screen printing or thick-film photo process with yellow light.

11. The method of fabricating a triode structure as claimed in claim 7, said method including screen printing, sandblasting and thick-film photo process with yellow light.

12. The method of fabricating a triode structure as claimed in claim 7, wherein said isomeric carbon emitters are carbon nonotube, carbon fiber or graphic nano-fiber.

* * * * *